United States Patent [19]

Bolang et al.

[11] 4,361,212

[45] Nov. 30, 1982

[54] BIDIRECTIONAL MECHANICAL LOAD LIMITER

[75] Inventors: Per A. Bolang, Bellevue; William B. Burstiner, Mercer Island, both of Wash.

[73] Assignee: The Boeing Company, Seattle, Wash.

[21] Appl. No.: 215,278

[22] Filed: Dec. 11, 1980

[51] Int. Cl.³ .............................................. F16F 7/12
[52] U.S. Cl. ...................................... 188/377; 74/492
[58] Field of Search ................ 74/492; 188/371, 376, 188/377; 280/750, 752, 805; 293/133

[56] References Cited

U.S. PATENT DOCUMENTS

| | | | |
|---|---|---|---|
| 2,724,463 | 11/1955 | Becker | 188/377 X |
| 3,181,821 | 5/1965 | Webb | |
| 3,228,492 | 1/1966 | Blumrich | 188/377 |
| 3,265,163 | 8/1966 | Gilbert et al. | |
| 3,308,908 | 3/1967 | Bunn | |
| 3,369,634 | 2/1968 | Mazelsky | |
| 3,493,082 | 2/1970 | Bell | |
| 3,528,529 | 9/1970 | Mazelsky | |
| 3,603,433 | 9/1971 | Keathley et al. | |
| 3,748,922 | 7/1973 | Farrell | |
| 3,847,252 | 11/1974 | Casciola | |
| 3,888,531 | 6/1975 | Straza et al. | |
| 3,968,862 | 7/1976 | Gorges et al. | |
| 4,066,149 | 1/1978 | Mazelsky | |

*Primary Examiner*—Duane A. Reger

*Attorney, Agent, or Firm*—Christensen, O'Connor, Johnson & Kindness

[57] ABSTRACT

A bidirectional mechanical load limiter for a push-pull control linkage includes a tubular crushable core that crushes in response to a predetermined tensile or compressive load to thereby limit the load in the linkage. The load limiter includes a tubular casing and a piston arranged in a telescoping configuration. The tubular crushable core, together with a pair of slide elements positioned adjacent the opposite ends of the core, is located within the casing by stop elements affixed to the inside of the casing. The piston passes through the bore of the tubular core and the slide elements and is retained in place by impeller elements affixed to the piston adjacent and abutting the slide elements. In normal operation, the load limiter operates as a rigid link in the linkage, with tensile and compressive loads being transmitted between the piston and casing through the crushable core. Under an excessive tensile load the piston and casing undergo relative extension as the core yields under the load. Likewise, under an excessive compressive load, the piston and casing undergo relative retraction and the crushable core is crushed inwardly into the casing. In the preferred embodiment, the crushable core is formed of an aluminum honeycomb material to provide a substantially constant force over the axial displacement range of the load limiter.

8 Claims, 9 Drawing Figures

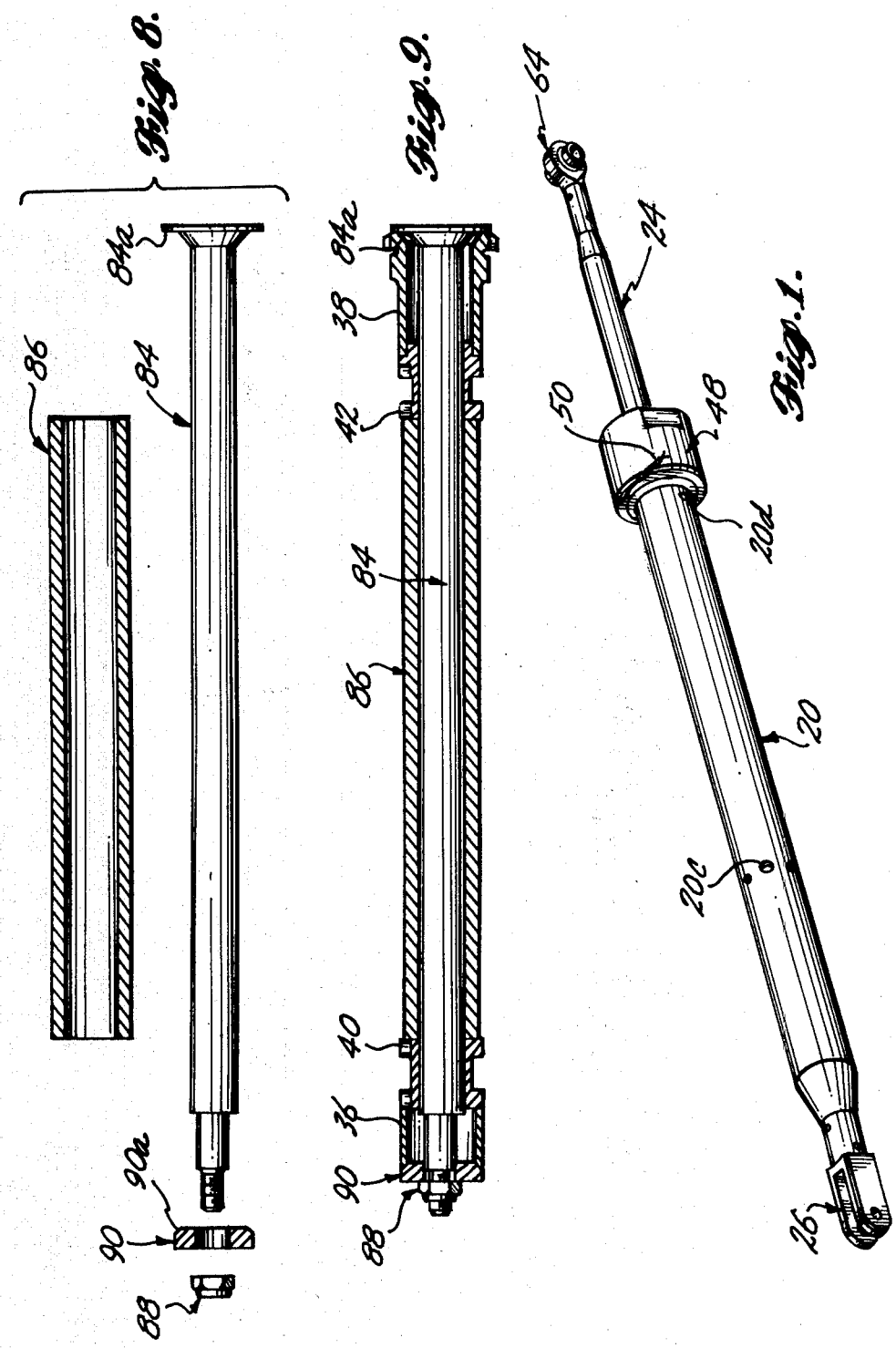

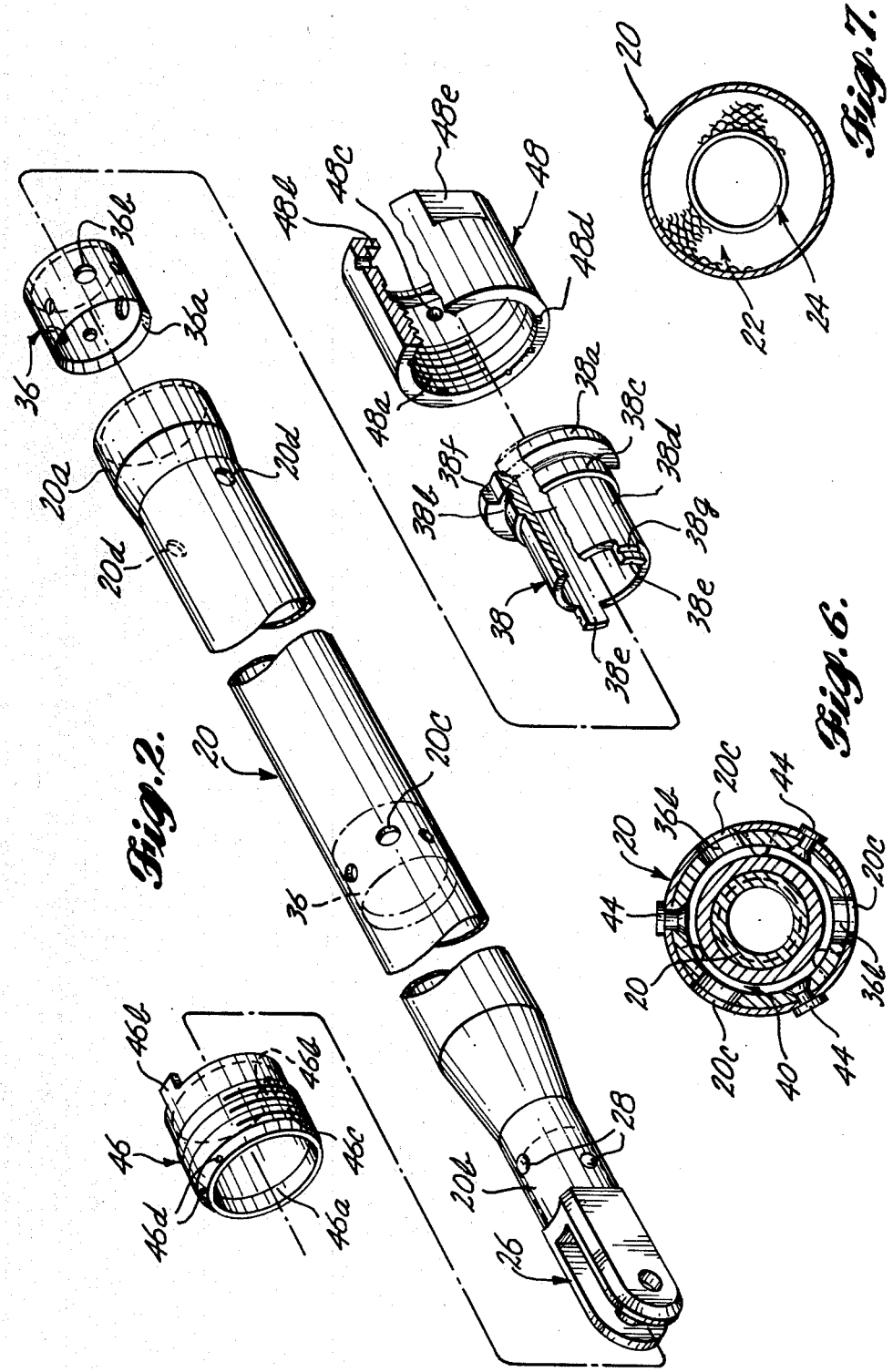

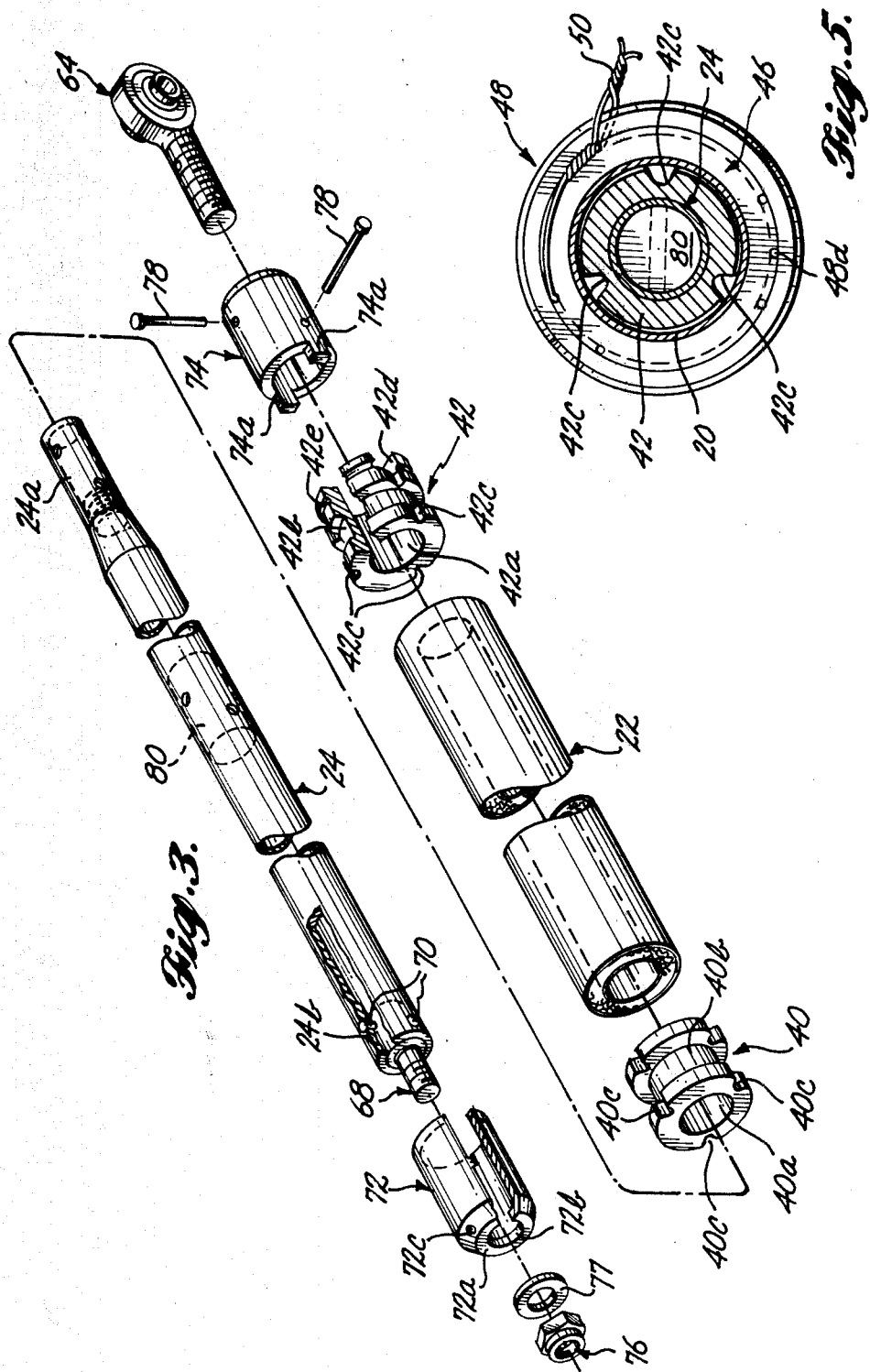

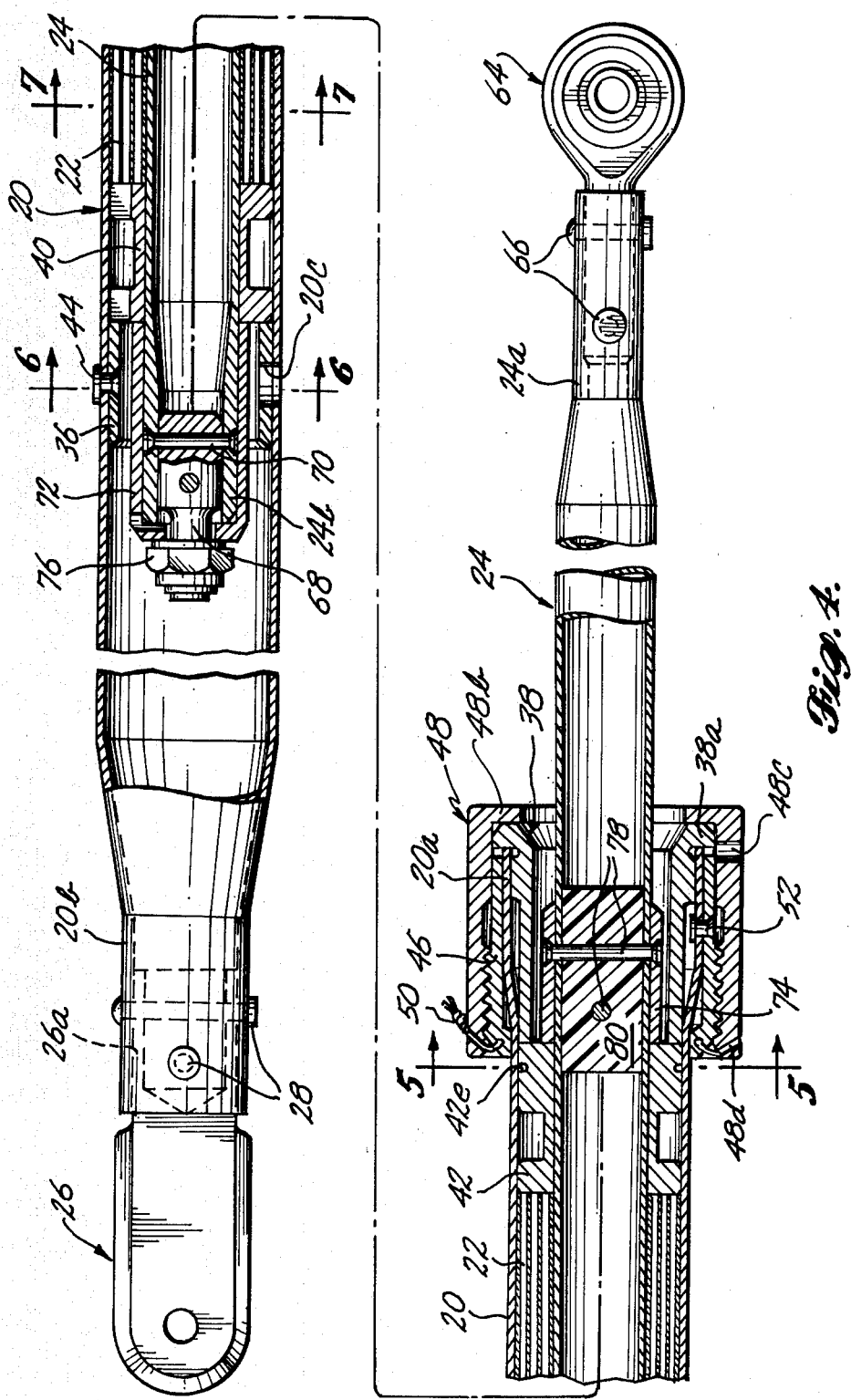

BIDIRECTIONAL MECHANICAL LOAD LIMITER

BACKGROUND OF THE INVENTION

The present invention relates generally to mechanical load limiters and, more particularly, load limiters for push-pull mechanical control linkages in aircraft.

Mechanical control linkages in airplanes are often long, relatively complex, and include multiple moving parts such as control rods, cables, and cranks. Because of weight load considerations, such mechanical linkages, including their associated structural support elements, are designed and built as light as possible. To this end, the various parts of the linkage are ordinarily designed and built so as to have the minimum size and weight necessary to accommodate the range of mechanical loads encountered in normal operation of the linkage. As a result, there is little allowance for excess loads and therefore a possibility of damage to the linkage in the event of binding or jamming at any point along the linkage. Such damage can be particularly difficult and costly to repair if it occurs in the structural support elements, since they are commonly part of larger structural members of the airplane. This is a problem even in manually actuated linkages, where large mechanical gains can result in substantial mechanical loads if jamming occurs.

For example, the rudder control system in one particular type of commercial transport airplane includes a mechanical push-pull control linkage by which the pilot controls a set of hydraulic actuators which drive the rudder. The linkage runs from pilot-operated foot pedals in the cockpit to control valve levers on the hydraulic actuators, which are located in the vertical stabilizer where they are coupled to the rudder.

Interposed in the mechanical linkage is a servocontrolled mechanical ratio changer that operates to reduce the ratio of rudder travel to pedal travel as airspeed increases. The ratio changer does this by reducing the mechanical gain of the control linkage as airspeed increases. At high airspeeds, the mechanical gain of the control linkage becomes very low, with the result that the force output capability of the ratio changer becomes very high. If, for any reason, jamming were to occur in the portion of the linkage between the ratio changer and the hydraulic actuators, with full force being applied to the rudder pedals by the pilot, the portion of the linkage between the ratio changer and the hydraulic actuators, particularly including the structural elements supporting the linkage, could be severely damaged.

The most straightforward way to avert the possibility of such damage would be to simply build the structural support components sufficiently strong to withstand the high mechanical loads that would result in the event of jamming. This approach, however, has been found to involve an unacceptably large weight penalty. In particular, most of the weight that would be added to the rudder control system by strengthening the linkage would be located in the tail of the airplane, where weight load limitations are particularly critical. Accordingly, another approach has been taken whereby it has been sought to provide a load-limiting device that may be installed as a rigid link in the mechanical linkages of the rudder control system, and which operates to limit the mechanical load on the linkage in the event of jamming or similar failure.

Various conventional approaches to this problem have been considered. For example, it has been to incorporate a shear pin assembly into the control linkage. A shear pin assembly can be incorporated into a mechanical control linkage relatively easily and with only a minimal weight addition. A primary disadvantage of shear pins, however, is that, whereas the desired shear load in many applications is on the order of two hundred pounds, the minimum shear load that can be obtained with a shear pin assembly with acceptable accuracy and repeatability is approximately 600 pounds. This is largely due to two factors. First, such shear pins are small in diameter and are therefore inherently subject to larger relative variations in strength due to the relatively larger effects of dimensional variations which are within ordinary manufacturing tolerances. Secondly, with smaller shear pins the closeness of fit between the shear pin and the pinned members is a significant factor affecting the shear strength of the assembly. More specifically, in a loosely fitted shear pin assembly there is a bending moment on the shear pin which becomes appreciable in proportion to the shear load, with resulting unpredictability in the strength of the assembly. As a result, with such small shear pins it becomes impractical to construct the shear pin assembly to the tolerances required to obtain predictable and reproducible results.

Another disadvantage of the use of shear pins is that the linkage elements connected by the shear pin assembly break free of one another in the event of shearing of the shear pin. As a result, there is a sudden and total loss of control through the mechanical linkage. Also, there is a danger of the thus disconnected linkage elements moving into a position where they may jam with one another.

Another conventional mechanical load limiter is a rotary, or cam and roller, mechanism. Such mechanisms include a spring-loaded roller engaged against a cam which forms a detent. The advantage of such a mechanism is that the cam may be readily tailored to provide a predetermined limiting force gradient. Also, the mechanism offers the capability to absorb overtravel and may be fabricated to have a negative load gradient. The primary disadvantage of such a mechanism is that it must be integrated with a crank installation and ordinarily requires a relatively large space envelope of approximately equal dimensions in width, length, and height. Also, the performance characteristic of such a mechanism cannot be readily modified once a design has been adopted, unless the change is limited to the detent, and unless such a change is of such a magnitude that it can be accomplished by revision of the cam profile.

Another previously known load limiter is a conventional linear spring cartridge. A linear spring cartridge can often be incorporated into a push-pull control rod or other mechanical linkage without the necessity of design changes to the adjoining mechanisms. However, the force gradient of a spring cartridge is invariably positive throughout its range of travel. As a result, the primary disadvantage of a spring cartridge is that a relatively long and heavy spring must ordinarily be employed to obtain an acceptably low force gradient and yet also obtain a sufficiently high initial yield force level.

Accordingly, it is the primary object and purpose of the present invention to provide an improved mechanical load limiter. More particularly, it is an object of the present invention to provide a double-acting, or bidirectional, load limiter for use in a push-pull control linkage, particularly in an airplane.

It is a further object of the present invention to provide a load limiter that operates as a rigid link in a push-pull control linkage up to a predetermined tensile or compressive load, and which operates to yield by extension or contraction in response to tensile or compression loads greater than the predetermined load. In this regard, it is yet another object of the invention to provide a load limiter that obtains the foregoing object and which yields with a substantially constant force over its entire range of extension or compression, and which also yields under the same predetermined load in both compression and tension. It is a further object to provide such a load limiter that is light in weight, compact in dimension, and which is retrofittable into preexisting control linkages.

It is also an object of the invention to provide a load limiter that is substantially free of end play in its precrushed state.

The type of failure briefly mentioned above, namely jamming of an aircraft rudder control system, is an extremely infrequent event. Such a failure might be expected to occur, on the average, no more than once in the lifetime of an entire fleet of airplanes. Accordingly, it is a further object of the present invention to provide a load limiter that is reliable over long periods of time, which requires relatively little maintenance and service over such periods, and yet which may be readily restored for use in the event it is actuated.

SUMMARY OF THE INVENTION

In accordance with the present invention, a load limiter particularly adapted for use in a push-pull control linkage in an airplane includes generally a tubular casing, a tubular crushable core retained coaxially within the casing, and a piston retained coaxially within the bore of the crushable core and extending from one end of the casing. In operation, the opposite ends of the piston and casing are connected to elements of a push-pull control linkage. As described in greater detail below, tensile as well as compressive loads are transmitted between the piston and casing through the crushable core. In normal operation, the piston and casing are prevented from undergoing relative axial displacement due to the resistance of the core to crushing, so as to form a rigid link in the control linkage.

In the event the load limiter is subjected to a mechanical load greater than a predetermined load, the core yields and is crushed axially within the casing and the piston and casing undergo relative axial motion. More specifically, if the load limiter is subjected to an excessive tensile load, the piston is drawn out of the casing and the core is crushed. If the load limiter is subjected to an excessive compressive load, the piston is driven into the casing crushing the core in this situation also. This operation of the load limiter is obtained as follows.

As mentioned above, the crushable core is retained coaxially within the tubular casing. Also retained in the casing are a tubular extension slide and a tubular retraction slide positioned adjacent the opposite ends of the crushable core. A retraction stop and an extension stop are affixed to the interior wall surface of the casing adjacent and abutting the extension and retraction slides. The extension and retraction slides are slidable within the casing, but are normally retained in place, together with the core located between them, by the two stops. The retraction slide is located adjacent and abutting the end of the crushable core nearest the open end of the casing from which the piston protrudes, with the extension slide being located at the opposite end of the crushable core.

The extension stop is affixed to the tubular casing adjacent the retraction slide, and the retraction stop is affixed to the inside surface of the casing adjacent the extension slide. The extension and retraction stops thus operate to locate the crushable core and the two slides axially within the casing. The retraction and extension stops may be of any suitable configuration that does not interfere with the sliding of the piston within the casing. Preferably, the retraction and extension stops are generally tubular and have an outside diameter sized to snugly fit within the casing such that they may be affixed to the casing in any conventional manner, for example with rivets. In the preferred embodiment the retraction stop is removable for servicing or replacement of the core, and is affixed to the open end of the casing with a removable end cap assembly.

The piston passes through the aligned bores of the crushable core and the retraction and extension slides. An extension impeller and a retraction impeller are affixed to the outer cylindrical surface of the piston adjacent and abutting the extension slide and retraction slide, respectively. The impellers thus locate the piston axially within the casing and operate to transmit axial loads from the piston to the slides and the core. More specifically, under a compressive load on the piston, that is, a load tending to drive the piston into the casing, the retraction impeller on the piston is driven against the retraction slide to apply the load to the core. Likewise, the extension impeller operates to transmit tensile loads on the piston to the opposite end of the core through the extension slide.

In operation, relative compressive loads between the casing and the piston are borne by the retraction stop affixed to the casing, the retraction impeller affixed to the piston, the crushable core and the slides. As long as the compressive load is less than a predetermined maximum load, the crushable core bears the load without crushing. If the compressive load exceeds the predetermined maximum load, the core is crushed and the piston is driven into the casing. More specifically, as the piston is driven into the casing the retraction impeller drives the retraction slide against the crushable core, causing the core to be crushed axially toward the extension slide and the fixed retraction stop. As crushing of the core proceeds, the piston slides inwardly into the casing and the extension impeller on the inner end of the piston moves inwardly away from the extension slide.

Conversely, in the event the load limiter is subjected to a tensile load greater than the predetermined maximum load, the piston and casing undergo relative axial extension and the core is crushed. More specifically, as the piston is drawn from the open end of the casing the extension impeller draws the extension slide against the crushable core to induce crushing. The core is thus crushed toward the retraction slide and the fixed extension stop at the open end of the casing.

In another aspect of the invention, the crushable core is preferably formed of an aluminum honeycomb material. Such material has numerous longitudinal cells, or channels, oriented parallel to one another. The honeycomb material is oriented with the longitudinal axes of the honeycomb cells extending axially within the casing. The advantage of employing aluminum honeycomb material in the core of the load limiter in such a fashion is that it resists crushing with a substantially constant force throughout its entire range of axial compression during crushing.

The above-described behavior of aluminum honeycomb material is observed strictly only after crushing has been initiated. With a fresh piece of honeycomb material, there is a substantially larger initial force of resistance as crushing is initiated. However, once the crushing is initiated, the force of resistance becomes considerably less and is substantially constant throughout the remaining displacement range. Accordingly, in another preferred aspect of the invention the aluminum honeycomb is crushed a slight amount prior to its installation in the load limiter so as to avoid the higher initial resistance of crushing and obtain a substantial constant force of resistance throughout the range of the load limiter.

In another aspect of the invention, axial interlocking tangs are provided in the retraction impeller, the retraction slide, and the extension stop to prevent relative rotation of the piston and casing. It is found that this prevents abrasion and deterioration of the honeycomb core that would otherwise result from relative rotation of the casing, the piston and the slides. As a result, gradual loosening of the load limiter components is avoided without in any way hindering the relative telescoping action of the piston and casing during actuation of the load limiter.

These and other aspects of the invention are more readily apparent by reference to the accompanying FIGURES and the following detailed description of the preferred embodiment.

BRIEF DESCRIPTION OF THE DRAWINGS

FIG. 1 is a pictorial view of the preferred embodiment of the load limiter, including the piston and casing in their normal operating configuration;

FIG. 2 is an exploded isometric view of the casing and associated elements of the load limiter;

FIG. 3 is an exploded isometric view of the piston and its associated components;

FIG. 4 is a longitudinal cross section of the load limiter;

FIG. 5 is a transverse cross section taken along line 5—5 of FIG. 4;

FIG. 6 is a transverse cross section taken along line 6—6 of FIG. 4;

FIG. 7 is a transverse cross section taken along line 7—7 of FIG. 4;

FIG. 8 shows the components of a special tool used in the initial assembly of the load limiter, including primarily a mandrel and a dummy core; and FIG. 9 shows the special tool assembled for installation in the casing of the load limiter.

DETAILED DESCRIPTION OF THE PREFERRED EMBODIMENT

Referring to FIGS. 1 through 7, the preferred embodiment of the load limiter of the present invention includes generally a tubular casing 20 open at one end, a tubular crushable core 22 engaged coaxially within the casing 20, and a piston 24 engaged coaxially within the central bore of the core 22 and extending from one end of the casing 20.

More specifically, the tubular casing 20 includes an outwardly swaged tubular portion 20a of relatively larger diameter at one end and is tapered at its opposite end to terminate in a relatively smaller diameter end portion 20b. A clevis 26 is affixed to the end portion 20b of the casing 20. The clevis 26 includes an integral plug portion 26a which is inserted in the smaller diameter end portion 20b of the casing 20 and fastened with a pair of rivets 28.

Affixed to the inside of the tubular casing 20 are a retraction stop 36 and an extension stop 38. As described in greater detail below, the retraction stop 36 and the extension stop 38 operate to locate and retain betweem them extension and retraction slides 40 and 42, respectively, and the crushable core 22.

The retraction stop 36 is tubular in configuration and is affixed to the inside surface of the casing 20 with rivets 44 in the location shown in phantom outline in FIG. 2. The retraction stop 36 includes an inwardly chamfered edge 36a at one end, for reasons discussed below. Three rivet installation holes 36b are provided in the retraction stop 36 and are alignable with a set of three holes 20c in the casing 20 to permit bucking of the rivets 44 during their installation.

The extension stop 38 is removable for the purpose of replacing the crushable core 22 and is normally retained in place inside the outwardly swaged portion 20a of the casing 20 by an externally threaded sleeve 46 and an end cap 48. The threaded sleeve 46 has an inside diameter sized to snugly fit the outwardly swaged portion 20a at the open end of the casing 20. An inwardly disposed flange 46a at one end of the threaded sleeve 46 has an inside diameter sized according to the outside diameter of the casing 20 so as to snugly encircle the casing 20 adjacent the swaged portion 20a. The sleeve 46 also includes a pair of axial tangs 46b extending axially from the end opposite the flange 46a for antirotation purposes, as described below. The sleeve 46 includes external threads 46c at the end adjacent the inner flange 46a. A pair of holes 46d are drilled through the flange 46a in a chordwise direction to provide for a locking wire 50 to secure the sleeve 46 to the end cap 48, as described below. During the assembly of the load limiter, the sleeve 46 is slipped onto the casing 20 from the tapererd end 20b and fastened to the outwardly swaged portion 20a of the casing 20 with three rivets 52 which are countersunk into the outer surface of the sleeve 46.

The extension stop 38 is in the form of a tubular plug insertable in the outwardly swaged open end 26 of the casing 20. In assembly, an outwardly disposed flange 38a at one end of the extension stop 38 operates to abut the end of the casing 20 to locate the extension stop 38 axially in the casing. In this regard, the outer sleeve 46 is sized in length such that it terminates just short (for example, 0.05 inch) of the end of the casing 20 when it is affixed to the casing 20, such that the flange 38a of the extension stop 38 abuts the end of the casing 20, rather than the end of the sleeve 46. A circumferential relief groove 38b is provided on the outside of the stop 38 at the base of the flange 38a to accommodate a possible sharp corner on the inside edge of the end of the casing 20.

The outer surface of the extension stop 38 is stepped in diameter so as to include a large diameter portion 38c adjacent the flange 38a and a smaller diameter portion 38d along the remainder of its length. The large diameter portion 38c is sized according to inside diameter of the swaged portion 20a of the casing 20. The smaller diameter portion 38d is likewise sized according to the inside diameter of the casing 20 to be snugly engaged by the casing 20. The axial length of the larger diameter portion 38c is somewhat less than the axial length of the outwardly swaged portion 20a of the casing 20 in order that the rivets 52 securing the sleeve 46 to the swaged portion 20a may be freely accommodated.

The extension stop 38 further includes a pair of axial tangs 38e extending from the inner end of the stop 38 and a pair of axial slots 38f in the flange 38a. The tangs 38e and slots 38f are for antirotation purposes with the slots 38f being engageable with the tangs 46b of the outer sleeve 46. The tangs 38e include circumferential grooves 38g on their outer surfaces for sight verification of their proper alignment in the casing 20, as described further below.

The end cap 48 includes internal threads 48a at one end and an internal flange 48b at its opposite end. The internal threads 48a are engageable with the external threads 46c of the sleeve 46. With the end cap 48 screwed to the sleeve 46, the inner flange 48b of the end cap 48 abuts the end surface of the flange 38a of the extension stop 38 to fix the location of the extension stop 38 in the assembled load limiter.

The end cap 48 further includes three inspection holes 48c for inspecting the abutment between the flange 38a of the extension stop 38 and the end of the casing 20. The end cap 48 further includes several holes 48d spaced around the circumference of the threaded end of the cap and drilled diagonally through the edge of the threaded end to accommodate the locking wire 50.

The end cap 48 further includes flats 48f milled on its opposite outer sides adjacent the flanged end of the cap 48. The flats 48f are for the purpose of enabling the cap 48 to be wrenched onto the threaded sleeve 46.

In the assembly of the load limiter, the end cap 48 is screwed onto the threaded sleeve 46 and secured thereto by means of a locking wire 50. More specifically, the locking wire is passed through the holes 46d in the sleeve 46 so as to extend annularly around the inside of the sleeve 46 at the base of the sleeve flange 46a. It will be noted that there is provided a space for the locking wire 50 between the outer surface of the casing 20 and the inner surface of the sleeve 46 immediately adjacent the flange 46a. At least one end of the locking wire 50 is passed through one of the holes 48d in the edge of the end cap 48, for example, as shown in FIG. 5, to prevent the end cap 48 from rotating with respect to the sleeve 46.

The extension slide 40 and retraction slide 42 are engaged in the casing 20 adjacent and abutting the opposite ends of the crushable core 22. The slides 40 and 42 are ordinarily retained in place against the crushable core 22 by the retraction stop 36 and the extension stop 38.

More specifically, the extension slide 40 is in the form of a short tube having a central axial bore 40a and a deep circumferential recess 40b in its external cylindrical surface. The slide 40 further includes three axial flutes 40c for the purpose of providing ventilation and drainage in an axial direction through the load limiter.

The retraction slide 42 is similar in configuration to the extension slide 40, similarly including a central bore 42a, a circumferential external recess 42b, and three axial flutes 42c. The retraction slide 42 is, however, somewhat longer than the extension slide 40. The longer portion of the retraction slide includes a pair of transverse radial slots 42d which cooperably engage the tangs 38e of the extension stop 38 and tangs 74a if a retraction impeller 74, described further below. The retraction slide 42 further includes a circumferential groove 42e which is positioned to align with the grooves 38g in the tangs 38e of the extension stop 38 when the crushable core 22 is in an unused, that is, uncrushed, condition. The grooves 38g in the tangs 38e and the aligned groove 42e in the retraction slide 42 may be viewed through the inspection holes 20d in the wall of the casing 20. The grooves 42e and 38g are ordinarily painted so as to be readily visible through the inspection holes 20d.

The tubular piston 24 is tapered to a small diameter portion 24a at one end and is swaged at the opposite end 24b to obtain increased wall thickness. The tapered end 24a is coupled to a conventional rod end bearing 64 by a pair of rivets 66. The opposite end 24b of the piston 24, that is, the end normally contained inside the casing 20, is swaged to obtain a reduced internal diameter, and thus an increased wall thickness, with no decrease in the external diameter of the piston 24. A threaded plug 68 is secured to the end 24b of the piston 24 by rivets 70.

Affixed to the piston 24 are an extension impeller 72 and a retraction impeller 74. The extension impeller 72 is tubular in configuration and has an inside diameter sized such that the impeller 72 fits snugly about the end of the piston 24. The impeller 72 includes an integral cap 72a at one end having a central bore 72b through which the threaded plug 68 passes. A nut 76 is threaded to the end plug 68 to secure the extension impeller 72 to the end of the piston 24 with a washer 77 interposed between the nut 76 and the cap 72a.

The retraction impeller 74 is tubular in configuration and also has an inside diameter sized to snugly fit the piston 24. A pair of rivets 78 secure the retraction impeller 74 to the piston 24. A plug of cast epoxy resin 80 is formed in the piston 24 at the position of the retraction impeller 74 to prevent buckling of the rivets 78 during their installation. The retraction impeller 74 includes a pair of axial tangs 74a which are normally engaged in the slots 42d of the retraction slide 42 for antirotation purposes, as described further below.

The crushable core 22 is formed of alternate sheets of flat aluminum foil and corrugated aluminum foil wound around a mandrel and adhesively bonded to as to form a tubular aluminum honeycomb structure having longitudinally extending channels, or cells 82, as illustrated in FIG. 7. One suitable crushable core material of this type is sold under the trademark TUBE-CORE by Hexcel Corporation of Dublin, Ca. The core 22 is thus oriented with the cells 82 extending axially within the casing 20. In the illustrated preferred embodiment, wherein one actual casing 20 has an outside diameter of approximately two inches, the aluminum honeycomb core 22 yields under a load of approximately two hundred pounds.

In operation, the load limiter ordinarily operates as a rigid link in a push-pull control linkage. Tensile and compressive loads are transmitted between the piston 24 and the casing 20 through the crushable core 22. It will be noted that in both compression and tension a compressive load is applied to and borne by the crushable core 22. For example, in tension the piston 24, through the extension impeller 72, pulls the extension slide 40 to compress the crushable core 22 against the retraction slide 42 and the fixed extension stop 38. Contrariwise, when the load limiter is under a compressive load, the piston 24, through the retraction impeller 74, drives the retraction slide 42 against the crushable core 22, through which the compressive load is transmitted to the shell 20 through the fixed retraction stop 36 and the extension slide 40.

Under all loads less than the predetermined maximum load, the tangs 38e and 74a are engaged in the slots 42d of the retraction slide 42 so as to prevent relative rotation between the extension stop 38, the slide 42, and the retraction impeller 74. Since the extension stop 38 is prevented from rotating relative to the casing 20 by the interlocking slots 38f and tangs 46b of the fixed sleeve 46, the piston 24 is prevented from rotating relative to the casing 20. Accordingly, the crushable core 22 does not undergo deterioration due to abrasion between the ends of the core 22 and the slides 40 and 42.

In the event the load limiter is subjected to a tensile or compressive load greater than the predetermined maximum load, the crushable core is crushed axially to cause the load limiter to yield in extension or retraction. For example, under an excessive tensile load, the crushable core 22 collapses toward the open end of the casing as the piston 24 is withdrawn from the casing. As the piston 24 is drawn out of the casing 20, the extension impeller 72 engages the extension slide 40 and draws it toward the open end of the casing 20 to crush the core 22 toward the fixed extension stop 38. In the process, the retraction impeller 74 moves with the piston 24 out of the end of the casing 20.

Likewise, under an excessive compressive load, the piston 24 is driven into the casing 20 to cause the core 22 to be crushed toward the extension slide 40 and the fixed retraction stop 36. More specifically, the retraction impeller 74 engages the retraction slide 42 and drives it against the core 22 to crush it axially toward the fixed extension slide 40 and the retraction stop 36.

Once the core 22 has been crushed to any extent, it must be replaced. It is replaced by removing the end cap 48 and the removable extension stop 38 and then withdrawing the piston 24 together with the slides 40 and 42 and the partially crushed core. The nut 76 is removed to allow removal of the extension impeller 72, the extension slide 40, and the crushed core. A new core 22 is placed on the piston 24 and the extension slide 40 and extension impeller 72 replaced. The new core 22 is sized slightly longer than its actual installed length such that it is partially crushed at one end as the nut 76 is screwed on. An inspection hole 72c in the retraction impeller 72 allows visual inspection to verify that the impeller 72 is properly seated against the threaded plug 68, and that the core 22 is therefore properly crushed in its final installed position.

The piston assembly is then reinstalled in the casing 20 as before and the extension stop 38 and end cap 48 secured in place.

Referring to FIGS. 8 and 9, in the initial fabrication of the load limiter a special tool assembly is employed to properly locate the retraction stop 36 in the casing 20. Precise location of the retraction stop 36 is necessary in order that the piston 24 will be properly engaged with no end play when finally installed. The tool includes a mandrel 84 sized to resemble the piston 24 and a dummy core 86 sized to represent the crushable core 22 as it is installed in the load limiter. That is, the dummy core 86 is noncompressible and is sized in length to represent the crushable core 22 after it is partially crushed and installed in the load limiter.

To assembly the tool assembly, the extension stop 38, retraction slide 42, dummy core 84, extension slide 40 and retraction stop 36 are installed on the mandrel 84 and secured with a nut 88 and a ring 90, as shown in FIG. 9. The ring 90 includes a chamfered outer edge 90a which cooperably abuts the chamfered edge 36a of the retraction stop 36 and centers the stop 36 on the mandrel 84. A flange 84a seats and centers the extension stop 38. The entire assembly is then placed in the casing 20 and the end cap 48 screwed on to securely locate the flange 38a of the extension stop 38 against the end of the casing 20. The retraction stop 36 is then correctly located axially in the casing 20 such that coaxial rivet holes may be drilled directly through both the casing 20 and the stop 36. The tool assembly is then removed from the casing, disassembled, and the stop 36 placed back in the casing 20 and affixed with the rivets 44.

Although the present invention is described and illustrated in terms of a preferred embodiment, it will be understood that variations, modifications, and substitutions that may be apparent to one of ordinary skill in the art may be made without departing from the spirit of the invention. Accordingly, the scope of the invention is defined by the folllowing claims.

The embodiments of the invention in which an exclusive property or privilege is claimed are defined as follows 1. A load limiter for a push-pull control linkage comprising a tubular casing open at one end, a tubular crushable core engaged coaxially in said casing, said crushable core having a central axial bore, an extension slide and a retraction slide engaged in said casing, said extension and retraction slides each being generally tubular and including a central axial bore, said extension and retraction slides being positioned adjacent and abutting the opposite ends of said crushable core in said casing, said retraction slide being adjacent the end of said crushable core nearest said open end of said casing, said casing having affixed to the inner wall surface thereof an extension stop and a retraction stop, said retraction stop and said extension stop being positioned adjacent to and abutting said extension slide and said retraction slide, respectively, to locate said extension and retraction slides and said crushable core between said stops within said casing, a piston coaxially engaged in said casing so as to pass through said bores of said crushable core and said slides and extend from said open end of said casing, said piston including a retraction impeller and an extension impeller affixed thereto adjacent and abutting said retraction slide and said extension slide, respectively, so as to locate said piston axially with respect to said crushable core in said casing, said retraction impeller being configured to move axially past said extension stop and said extension impeller being configured to move axially past said retraction stop, said piston and said casing cooperating at tensile loads greater than a predetermined maximum load in extension to crush said crushable core by movement of said piston, said extension impeller, and said extension slide toward said open end of said casing, said piston and said casing cooperating at compressive loads in excess of said predetermined maximum load in retraction to crush said crushable core by action of said retraction slide, said piston, and said retraction impeller being driven into said casing.

2. The load limiter defined in claim 1 wherein said crushable core is formed of an aluminum honeycomb material.

3. The load limiter defined in claim 2 wherein said aluminum honeycomb material includes honeycomb cells oriented with their longitudinal axes parallel to the longitudinal axis of said casing.

4. The load limiter defined in claim 3 wherein said crushable core is partially crushed in its installed position to prevent end play and to obtain a substantially uniform force over the crushable range of the core.

5. The load limiter defined in claim 1 or 2 wherein said retraction slide, extension stop, and retraction impeller include interlocking axial tangs to prevent relative rotation between said piston, casing, and retraction slide.

6. The load limiter defined in claim 1 or 2 wherein said retraction stop, said extension slide, and said extension impeller include interlocking axial tangs to prevent relative rotation of said piston, casing, and extension slide.

7. The load limiter defined in claim 1 or 2 wherein said casing includes an outwardly swaged portion at said open end of said casing, and wherein said extension stop comprises a removable internal sleeve positioned inside said casing adjacent said open end of said casing, said load limiter further comprising an externally threaded external sleeve affixed about said outwardly swaged portion of said casing, and an end cap having a central bore and being threadably engageable with said externally threaded sleeve to retain said extension stop in said casing abutted against said retraction slide.

8. The load limiter defined in claim 1 or 2 wherein said retraction and extension slides include axial flutes to provide drainage and ventilation to said crushable core.

* * * * *